(12) United States Patent
Maisonneuve

(10) Patent No.: US 12,171,176 B2
(45) Date of Patent: Dec. 24, 2024

(54) FERTILIZER DESICCANT SYSTEM AND METHOD

(71) Applicant: Oakland University, Rochester, MI (US)

(72) Inventor: Jonathan Maisonneuve, Auburn Hills, MI (US)

(73) Assignee: Oakland University, Rochester, MI (US)

( * ) Notice: Subject to any disclaimer, the term of this patent is extended or adjusted under 35 U.S.C. 154(b) by 0 days.

(21) Appl. No.: 18/039,049

(22) PCT Filed: Dec. 3, 2021

(86) PCT No.: PCT/US2021/061706
§ 371 (c)(1),
(2) Date: May 26, 2023

(87) PCT Pub. No.: WO2022/120110
PCT Pub. Date: Jun. 9, 2022

(65) Prior Publication Data
US 2023/0345883 A1    Nov. 2, 2023

Related U.S. Application Data

(60) Provisional application No. 63/121,322, filed on Dec. 4, 2020.

(51) Int. Cl.
*A01G 9/24*    (2006.01)
*B01D 47/00*    (2006.01)
*B01D 53/22*    (2006.01)
*B01D 53/26*    (2006.01)
*C05B 7/00*    (2006.01)
*F24F 3/14*    (2006.01)

(52) U.S. Cl.
CPC ............. *A01G 9/246* (2013.01); *B01D 47/00* (2013.01); *B01D 53/22* (2013.01); *B01D 53/26* (2013.01); *C05B 7/00* (2013.01); *F24F 3/1417* (2013.01); *F24F 3/1423* (2013.01)

(58) Field of Classification Search
CPC ........ B01D 47/00; B01D 53/22; B01D 53/26; F24F 3/1423; F24F 3/1417
See application file for complete search history.

(56) References Cited

U.S. PATENT DOCUMENTS 3,981,619 A * 9/1976 Mitter ................... B41F 31/022
101/119
9,266,052 B2    2/2016 Wright
(Continued)

FOREIGN PATENT DOCUMENTS

JP        H0532474 A  *  2/1993

OTHER PUBLICATIONS

International Search Report and Written Opinion dated Feb. 17, 2022 for PCT/US2021/061706.

*Primary Examiner* — Robert A Hopkins
(74) *Attorney, Agent, or Firm* — Fishman Stewart PLLC

(57) ABSTRACT

A fertilizer desiccant system including a container for holding a fertilizer-based liquid desiccant, a pump or other supply providing means, a fluid conduit, and air mover. In embodiments, the fertilizer-based liquid desiccant comprises a concentrated fertilizer solution and/or a vapor pressure gradient between the liquid and indoor ambient air drives vapor transport towards the liquid desiccant.

24 Claims, 5 Drawing Sheets

(56) References Cited

U.S. PATENT DOCUMENTS

| | | |
|---|---|---|
| 9,714,183 B1 | 7/2017 | Flynn |
| 2018/0209670 A1* | 7/2018 | Feng .................. F24F 3/14 |
| 2020/0198991 A1 | 6/2020 | Bower |
| 2020/0222854 A1 | 7/2020 | Maisonneuve |
| 2020/0267894 A1 | 8/2020 | Maisonneuve |

* cited by examiner

| | Ventilation | Ventilation with Heat Exchanger | Dew-Point Condensation | Liquid or Solid Desiccant | Fertilizer Liquid Desiccant |
|---|---|---|---|---|---|
| Water | Water vapor is lost ★ | Water vapor is lost ★ | Water vapor is recovered as condensate but may need filtration ★★ | Water vapor is recovered but must be carefully separated from desiccant ★★ | Water is recovered by fertilizer and ready for delivery ★★★ |
| Energy | Heating and cooling to condition fresh air ★ | Minimal heating and cooling to condition fresh air ★★★ | Mechanical work is needed to bring air to dew point ★ | Thermal energy is needed to regenerate desiccant ★ | Minimal work is needed to circulate fertilizer desiccant ★★★ |
| Temperature | Introduces fresh air at outside temperature ★ | Most sensible energy is recovered between fresh and exhaust air ★★★ | Requires lowering air temperature to dew-point ★ | Water vapor phase change releases minimal heat to air ★★★ | Water vapor phase change releases minimal heat to air ★★★ |
| $CO_2$ | Effectiveness of $CO_2$ enrichment is limited ★ | Effectiveness of $CO_2$ enrichment is limited ★ | $CO_2$ enrichment is supported ★★★ | $CO_2$ enrichment is supported ★★★ | $CO_2$ enrichment is supported ★★★ |
| Other | Insects, spores and contaminants may be introduced ★ | Insects, spores and contaminants may be introduced ★ | No insects, spores and contaminants may be introduced ★★★ | No insects, spores and contaminants may be introduced ★★★ | No insects, spores and contaminants may be introduced ★★★ |

FIG. 5

FERTILIZER DESICCANT SYSTEM AND METHOD

CROSS-REFERENCE TO RELATED APPLICATION

This application is a National Stage Patent Application of International Patent Application No. PCT/US2021/61706 filed Dec. 3, 2021, which claims the benefit of U.S. Provisional Patent Application Ser. No. 63/121,322, filed on Dec. 4, 2020, the disclosure of which is hereby incorporated by reference in its entirety as though fully set forth herein.

TECHNICAL FIELD

The present disclosure generally relates to fertilizer desiccant systems and methods.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Nearly 70% of all water withdrawn around the world is used to grow food, and water demand will continue to increase as production intensifies to feed growing populations. In field agriculture, much of the water used for irrigation may be lost to the environment by soil evaporation, weed transpiration, surface runoff, and/or deep percolation. Plant cultivation in controlled plant environments (CPE) has the potential to drastically reduce the water footprint of crops and make a more sustainable future possible. In particular, CPEs that are closed from the ambient air (known as closed-CPEs) have the potential to nearly close the water cycle, and limit water use to almost just what is used for plant growth. For example, closed greenhouses that recover water vapor from plant transpiration, and that use hydroponic or aeroponic cultivation methods may increase water efficiency by as much as 95%. In addition, closed-CPEs may integrate the advantages of water recovery to others, such as highly accurate microclimate control, effective $CO_2$ enrichment, and protection from pathogens. For these reasons, 80% reductions in chemical pesticides and herbicides, and 20% increases in yields have been observed in closed-CPEs, with improved food quality and additional phytonutrients.

One of the challenges in operating closed-CPEs is to effectively maintain indoor humidity levels without ventilation, and to do so in an energy efficient manner. Effective humidity control can be significant for healthy plant physiology and production, and for efficient and sustainable CPE operation. Insufficient humidity can lead to high transpiration, plant wilting, and damage, while excessive humidity can lead to inadequate nutrient uptake, poor flowering and fruiting, and risk of fungus and disease.

It is therefore desirable, to among other things improve the potential of closed-CPEs, to provide advances in technology and practices, including those that may balance water recovery with effective and energy efficient indoor humidity control.

SUMMARY

Embodiments of a fertilizer desiccant system may include a container for holding a fertilizer-based liquid desiccant; a pump or other supply providing means; a fluid conduit; and/or an air mover. In embodiments, a fertilizer-based liquid desiccant may comprise a concentrated fertilizer solution which can establish a vapor pressure gradient between the liquid and indoor ambient air which may drive vapor transport towards the liquid desiccant.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

FIG. 5 is a table illustrating some comparative advantages of embodiments of the disclosed fertilizer desiccant systems relative to other systems.

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1A:
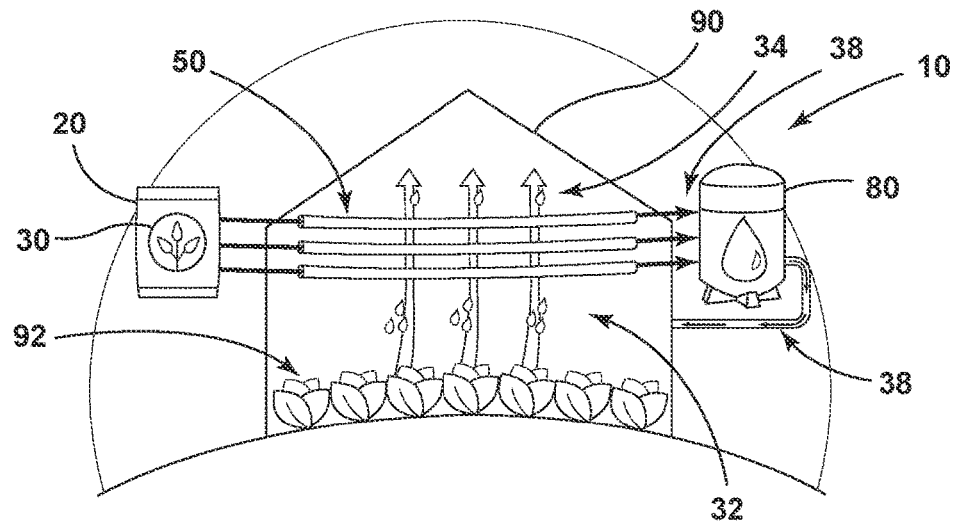
FIGS. 1A-1C are schematic representations of an embodiment of a fertilizer desiccant system according to aspects and teachings of the disclosure.
Figure 1B:
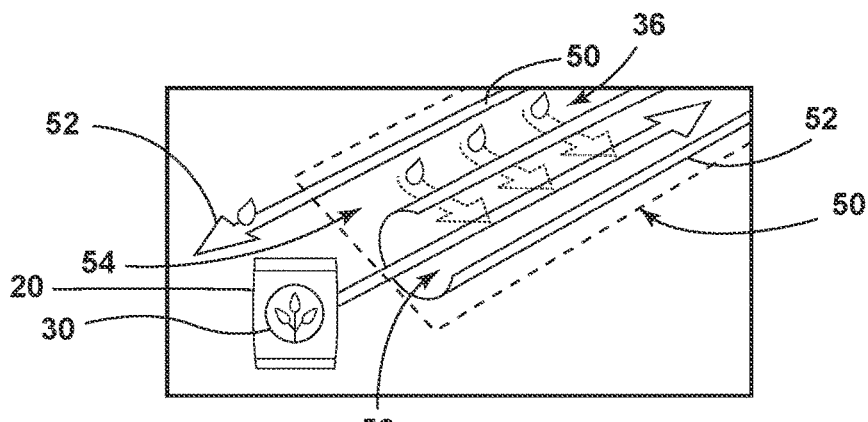
Figure 1C:
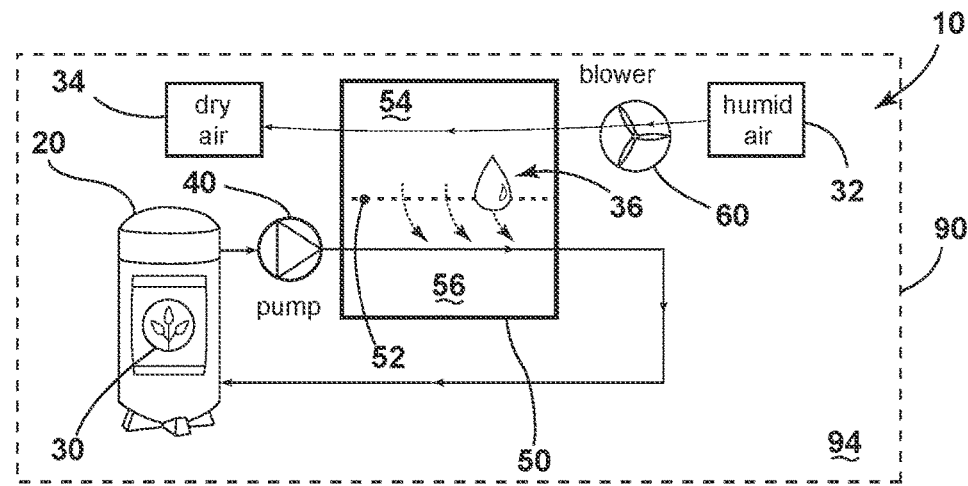

Referring now to FIGS. 1A-1C, a fertilizer desiccant system 10 according to an embodiment of the disclosure is generally illustrated. In an embodiment, such as generally illustrated, the fertilizer desiccant system 10 may involve a fertilizer-based liquid desiccant 30 that may be used in a membrane dehumidification system in a facility 90, such as a greenhouse or other indoor plant environment. A facility 90 may for example, include a CPE, such as a closed-CPE. As generally illustrated, a fertilizer desiccant system 10 may include a container or container 20 that may hold fertilizer-based desiccant 30, such as a fertilizer-based liquid desiccant, a pump 40 (or other supply providing means), one or more fluid conduits 50, and/or an air mover 60 (e.g., blower, fan, air multiplier fan, etc.). A fluid conduit 50 may include one or more of a variety of shapes, sizes, configurations, and/or materials. For example and without limitation, a fluid conduit 50 may include a pipe, tube, tank, reservoir, or the like, and may include a first chamber 54 and a second chamber 56 that may be separated by a membrane 52. In some configurations, a fluid conduit 50 may include and/or be configured as a membrane contractor.

With embodiments of a system 10, fertilizer-based desiccant 30, which may include concentrated fertilizer solution and may have low vapor pressure potential (e.g., lower than the vapor pressure potential of ambient/humid air 32), may be circulated through the one or more fluid conduits 50. Vapor pressure gradients between the liquid desiccant 30 and humid air 32 (e.g., indoor ambient air) may drive vapor transport towards the liquid desiccant 30, such as across a membrane 52 of the fluid conduit 50, and, as such, moisture/water 36 may be recovered (e.g., spontaneously) by the liquid desiccant 30. When sufficiently diluted with water/water vapor 36 from the humid air 32, the liquid desiccant 30 may comprise a fertilizer solution 38 that can then be supplied directly to plants 92 (e.g., to fertilize the plants 92), such as via hydroponic or other fertigation delivery methods.

Such systems 10 may take advantage of the energy potential of concentrated fertilizers to drive energy efficient water recovery, while effectively controlling humidity levels for healthy plant physiology and production. Such systems 10 may, for example and without limitation, provide some or all of the following advantages:
  (i) nearly close the water cycle by reducing the water footprint of plants/crops 92 to just what is needed for plant growth (e.g., extracted water may be captured and reused as opposed to vented);
  (ii) consume almost no energy, except very minimally to circulate air and liquid; and/or
  (iii) promote and support a healthy indoor plant environment by maintaining target humidity, temperature, and $CO_2$.

In contrast with fertilizer-based desiccant systems, such as disclosed herein, conventional desiccant systems for greenhouse and plant environments have typically involved magnesium chloride MgCl2, not fertilizer-based desiccants.

The embodiments illustrated in FIGS. 1A-1C, 3A, and 4 and described herein represent just one configuration of using fertilizer-based liquid desiccants, including embodiments of a membrane-based dehumidification process. Other embodiments of the concept might, for example and without limitation, include the use of fertilizer-based liquid desiccant in packed beds or in other non-membrane-based configurations.

Figure 2A:
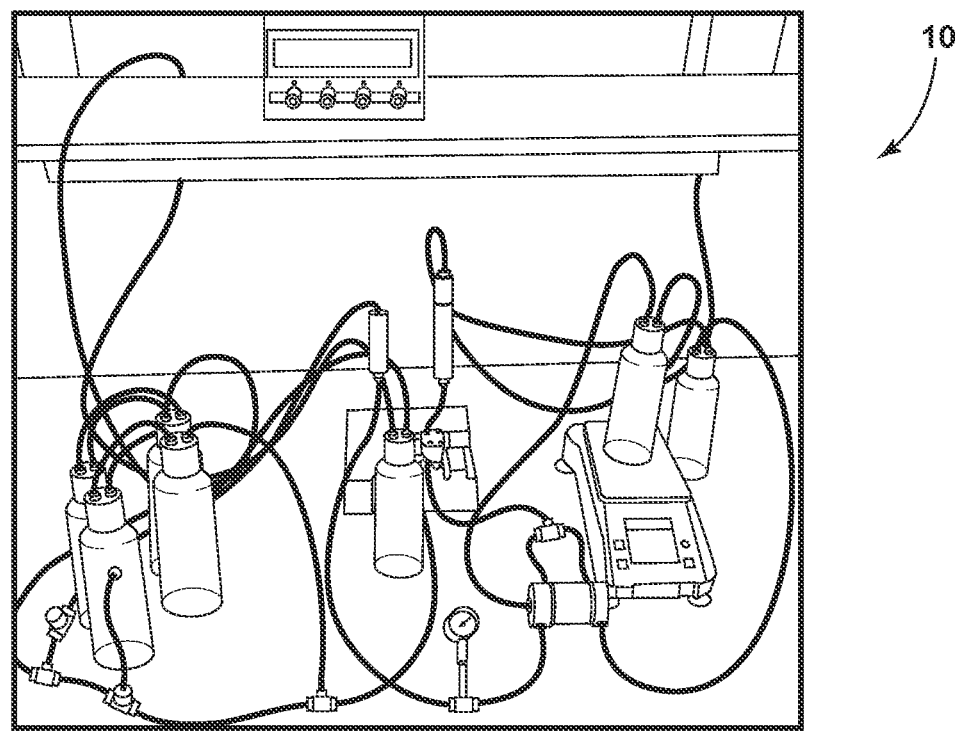
FIG. 2A is an illustration of a laboratory testing system/setup associated with the instant disclosure.
Figure 2B:
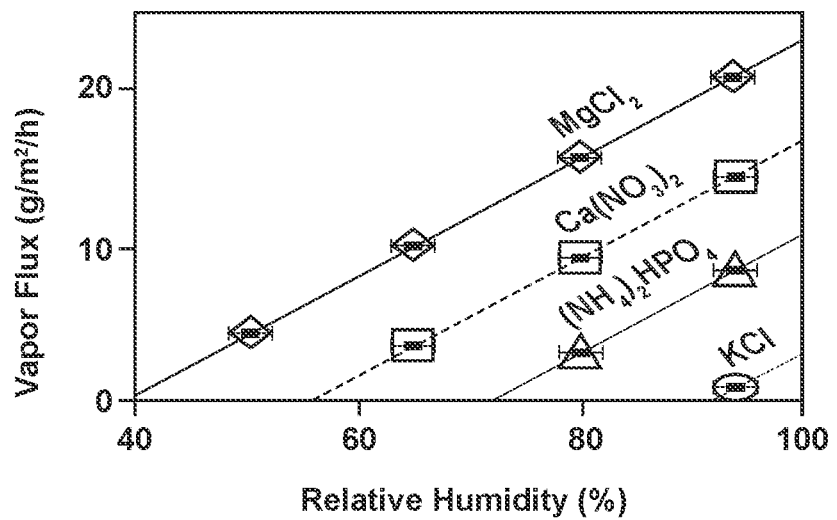
FIG. 2B is a graph generally representing graphical results from a fertilizer-based dehumidification process.

FIGS. 2A and 2B generally illustrate a laboratory setup (FIG. 2A) and graphical results from a fertilizer-based dehumidification process (FIG. 2B). As generally shown, N—P—K (nitrogen, phosphorus, potassium) fertilizers, such as calcium nitrate $Ca(NO_3)_2$, diammonium phosphate $(NH_4)_2HPO_4$, and potassium chloride KCl are capable of driving water vapor transfer from humid air towards a fertilizer solution. However, the disclosure is not limited to such fertilizers. For example, a wide range of single solute and blended fertilizer solutions may exhibit similar performance and may also be suitable for such systems and applications.

Figure 3A:
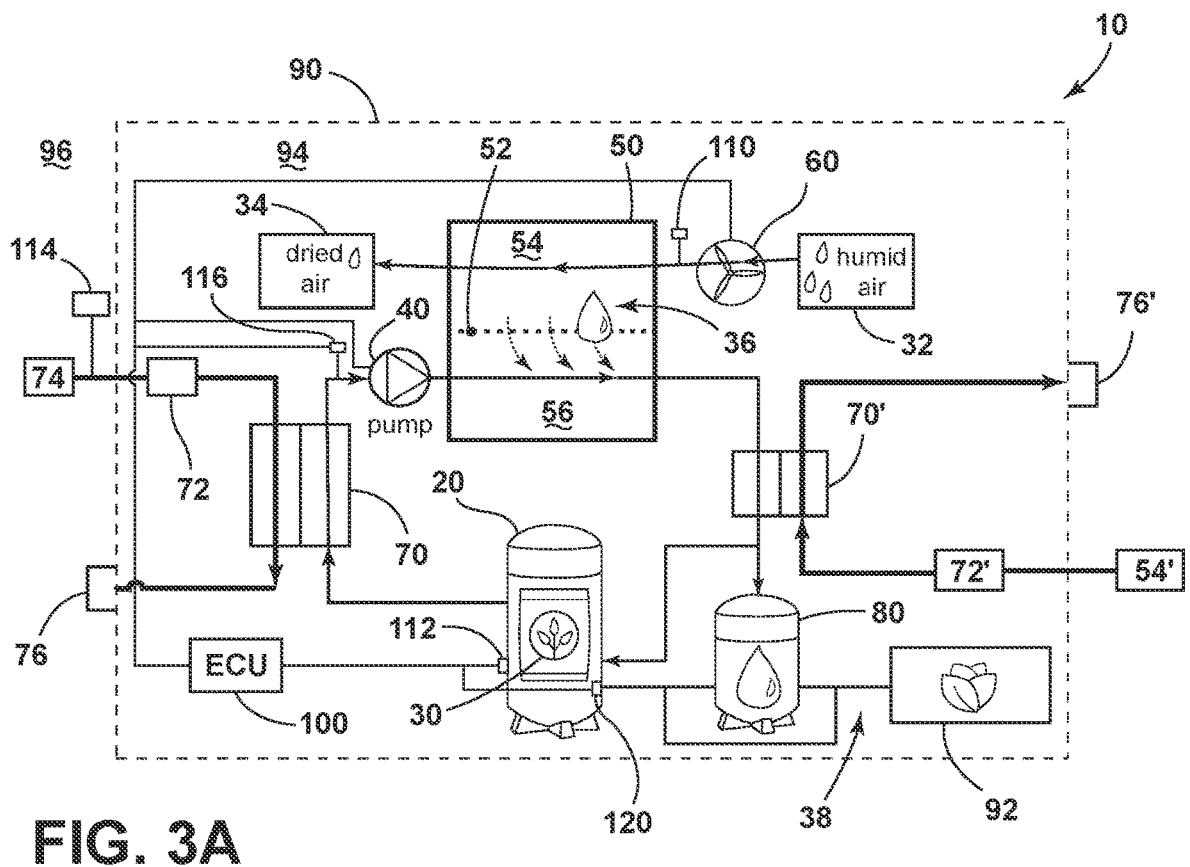
FIG. 3A is a schematic representation of an embodiment of a fertilizer desiccant system according to aspects and teachings of the disclosure, and including a heat exchanger.

In embodiments, the performance of fertilizer dehumidification processes can be significantly improved via effective thermal management. Some embodiments of a system 10, which may provide improved performance, may include or incorporate a heat exchanger 70 with a fertilizer desiccant loop. An illustration of such an embodiment is generally shown in FIG. 3A. In embodiments, a heat exchanger 70 may be connected before a fluid conduit 50 (e.g., an output of the heat exchanger 70 may be connected to an input of the fluid conduit 50 to provide cooled fertilizer-based desiccant 30 to the second chamber 56 of the fluid conduit 50). However, with some embodiments, a heat exchanger 70' may, additionally or alternatively, be provided after the fluid conduit 50 (e.g., an input of the heat exchanger 70' may be connected to an output of the fluid conduit 50 to cool diluted fertilizer-based desiccant 30) from the fluid conduit 50.

Figure 3B:
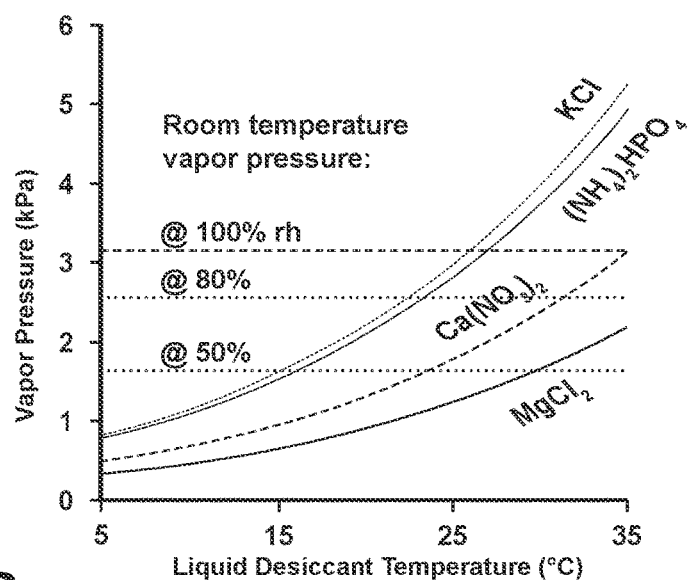
FIG. 3B is a graph generally representing vapor pressure relative to liquid desiccant temperature.

As generally illustrated in the graph included in FIG. 3B, the vapor pressure of fertilizer-based liquid desiccant 30 may be related to its temperature. Generally, as vapor condenses on the liquid desiccant 30, heat of condensation is released and it may cause fluids to heat up. Moreover, an increase in desiccant temperature may tend to reduce vapor removal rates. Maintaining cool liquid desiccant temperatures to lower the solution vapor pressure can lead to significant increases in vapor flux.

With some embodiments/applications, thermal management during desiccant dehumidification can provide significant results, and may be achieved by using a heat exchanger 70 coupled to a cold temperature sink 74 (such as outdoor/ambient air in colder climates, cool ground temperatures in other climates, ground water, and/or another source of relatively cool fluid). The heat exchanger 70 may include and/or be connected to an actuator 72, such as pump and/or blower, that may provide relatively cool fluid from the temperature sink 74 to the heat exchanger 70, and, after the cool fluid cools the liquid desiccant 30, the less cool fluid may, in some configurations, flow out of the heat exchanger 70 and/or the facility 90, such as via an exhaust/outlet port 76. A heat exchanger 70' may be connected to a temperature sink 74' (which may or may not be the same as sink 74), and/or may be connected to and/or include an actuator 72' that may be configured in the same or similar manner as actuator 72. For example, cool fluid from a cool fluid source/temperature sink 74' may be provided to the heat exchanger 70' via an actuator 72' and, after the cool fluid cools the liquid desiccant 30, the less cool fluid may, in some configurations, flow out of the heat exchanger 70' and/or the facility 90, such as via an exhaust/outlet port 76' (which may or may not be the same as or connected to port 76). A heat exchanger 70, 70' may be configured such that the cool/exterior fluid does not mix with fluid in the interior 94 of the facility 90.

With embodiments, such as generally illustrated in FIG. 3A, an electronic control unit (ECU) 100 may be configured to control, at least in part, operation of one or more portions/components of a system 10, such as a pump 40, an air mover 60, and/or a heat exchanger 70. For example, an ECU 100 may control operation of a pump 40 to provide fertilizer-based liquid desiccant 30 to the fluid conduit 50, and/or operate the air mover 60 to provide humid air 32 to the fluid conduit 50. The liquid desiccant 30 and the humid air 32 may be provided in opposite directions to the fluid conduit 50. The ECU 100 may operate the pump 40 to provide an amount of fertilizer-based liquid desiccant 30 that corresponds to a humidity level of the humid air 32. For example, if the humidity level is low (e.g., relative to a set or threshold amount), the ECU 100 may operate the pump 40 at a lower output level/speed, and/or if the humidity level is high, the ECU 100 may operate the pump 40 at a higher output level/speed. Additionally or alternatively, the ECU 100 may operate the air mover 60 to provide an amount of humid air 32 to the fluid conduit 50 that corresponds the humidity level of the humid air 32. For example, if the difference between the current humidity level and a set/threshold humidity is high, the ECU 100 may operate the air mover 60 at a higher output level/speed than if than if the difference is low. The ECU 100 may be connected to one or more sensors that may be configured to sense one or more properties of the system 10, such as a sensor 110 that may be configured to sense a humidity and/or temperature of the humid air 32 (e.g., in a facility 90), a sensor 112 that may be configured to sense a temperature and/or concentration of the liquid desiccant 30 (e.g., in a container 20), a sensor 114 that may be configured to sense a temperature of the fluid from the external fluid source 74, 74', and/or a sensor 116 that may be configured to sense a temperature of the liquid desiccant 30 output from a heat exchanger 70, among others. The ECU 100 may control one or more portions of a system 10 according to information from one or more sensors 110-116.

In embodiments, the ECU 100 may be configured to control a heat exchanger 70, 70' and/or an actuator 72, 72' thereof and/or connected thereto, such as to control the temperature of the liquid desiccant 30 and/or the temperature in/proximate the fluid conduit 50. For example, the ECU 100 operate the heat exchanger(s) 70, 70' to maintain the liquid desiccant 30 and/or the temperature in/proximate the fluid conduit 50 at or below a threshold level (e.g., a vapor exchange temperature threshold). The ECU 100 may operate the heat exchanger(s) 70, 70' and/or the actuator(s) 72, 72' at higher output levels/speeds if the temperatures of the liquid desiccant 30 and/or the fluid conduit 50 are significantly higher than the threshold level.

With embodiments, the ECU 100 may control a heat exchanger 70, 70' to provide additional cooling of the liquid desiccant 30 when the concentration of the liquid desiccant 30 is lower. For example, the desiccant 30 may be cycled through the fluid conduit 50 a plurality of times, and with each cycle, the desiccant 30 may be further diluted with additional moisture 36 from the humid air 32. As the concentration decreases, the amount of moisture 36 extracted (e.g., per unit volume of liquid desiccant 30) may be lower than at higher concentrations, and maintaining lower temperatures may improve/maximize the extraction rate. In some configurations, the ECU 100 may operate the pump 40 and/or the air mover 60 at greater levels/speeds as the concentration of the desiccant 30 decreases.

Figure 4:
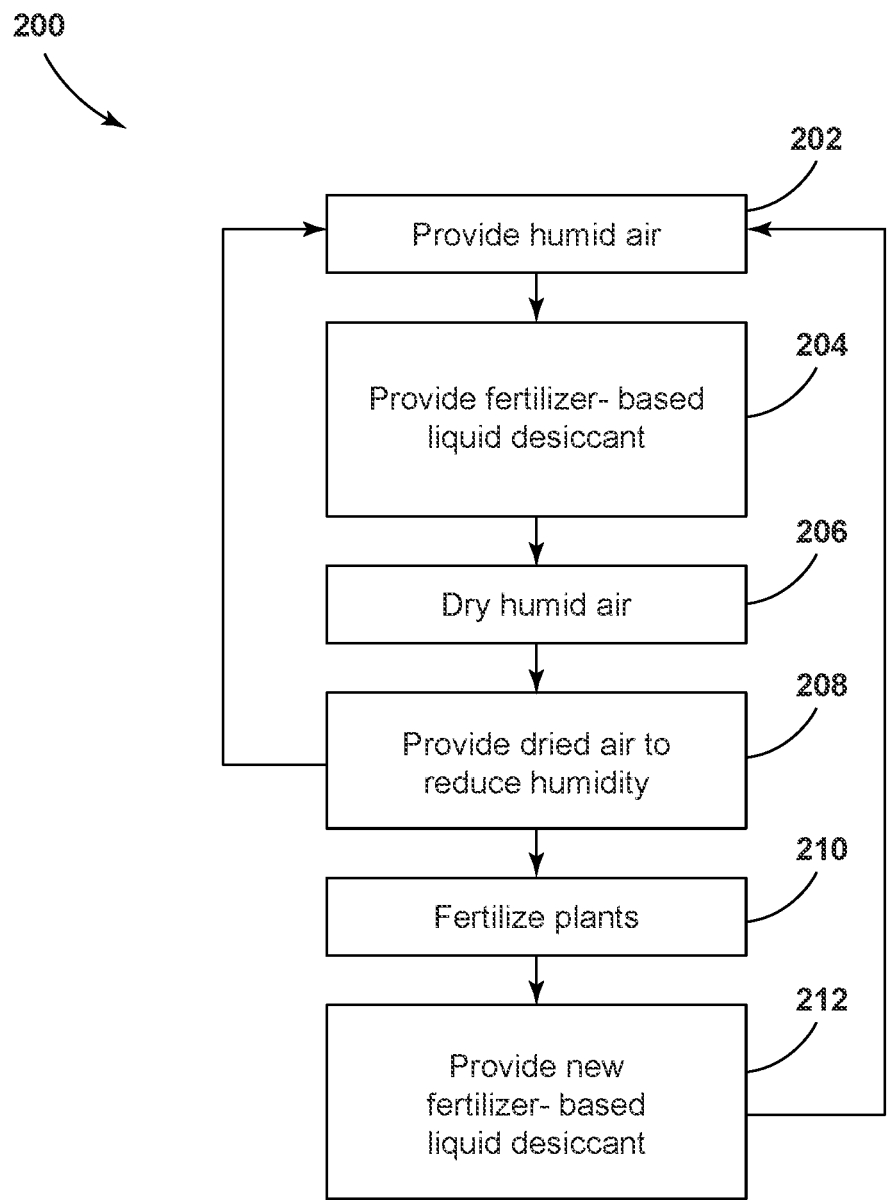
FIG. 4 is a flow chart generally illustrating an embodiment of a method of operating a fertilizer desiccant system.

With embodiments, such as generally illustrated in FIG. 4, a method 200 of operating a fertilizer-based desiccant system 10 may include providing humid air 32 to a first chamber 54 of a fluid conduit 50 (block 202), such as via an air mover 60. The humid air 32 may be provided from an interior 94 of a facility 90. The method 200 may include providing the fertilizer-based desiccant 30 to a second chamber 56 of the fluid conduit 50 (block 204), such as via a pump 40. The method 200 may include providing dried air 34 from the first chamber 54 via extracting moisture 36 from the humid air 32 to the liquid desiccant 30, such as from the first chamber 54 to the second chamber 56 (block 206). The dried air 34 may be provided/returned to the inside of a facility 90 (block 208), which may reduce the humidity level of the facility 90. The dried air 34 may have a lower humidity level than the humid air 32, but may or may not be completely dry. Extracting moisture 36 from the humid air 32 (block 206) may include moisture 36 permeating through a membrane 52, such as due to a vapor pressure gradient. The membrane 52 may separate a first chamber 54 and a second chamber 56 of a fluid conduit 50.

In embodiments, providing the fertilizer-based liquid desiccant (block 204) may include cooling the fertilizer-based liquid desiccant 30, such as via a heat exchanger 70, 70' that may be connected to an external fluid source/temperature sink 74, 74'.

With embodiments, extracting the moisture 36 from the humid air 32 to the liquid desiccant 30 may include creating a diluted (at least to some degree) version of the liquid desiccant 30. The method 200 may include utilizing the diluted version in block 204 and repeating blocks 202-208 (e.g., conducting cycles to reduce humidity with increasingly diluted liquid desiccant 30).

In embodiments, at a certain level or levels of dilution (which may occur after one or more cycles), the diluted version may comprise a diluted fertilizer solution 38 that may be provided to one or more plants 92. For example, the method 200 may include fertilizing one or more plants 92 with the diluted fertilizer solution 38 (block 210), which may facilitate growth of the one or more plants 92. The diluted fertilizer solution 38 may be provided directly to the one or more plants 92, such as without additional modification. For example, the system 10 may include a valve 120 that may be configured to selectively provide diluted fertilizer solution 38 to a container 80 (e.g., for subsequent application) and/or to one or more plants 92. The valve 120 may, for example and without limitation, be disposed in and/or connected to container 20. In some configurations, the valve 120 may be electronically controlled via the ECU 100, such as via a solenoid. For example, block 210 may include the ECU 100 opening or shifting the valve 120 to provide the diluted fertilizer solution 38 to one or more plants 92 in the facility.

With embodiments, the method 200 may include providing additional/new concentrated fertilizer-based liquid desiccant (block 212), such as to container 20, and repeating/cycling one or more of blocks 202-210 (e.g., extracting additional moisture 36 from the humid air 32 via the new fertilizer-based liquid desiccant to control the humidity of the facility 90). The ECU 100 may be configured to implement some or all portions of the method 200, such as via controlling one or more of a pump 40, an air mover 60, a heat exchanger 70, 70', and/or a valve 120, to control the humidity of a facility 90 and/or to provide a fertilizer solution to one or more plants. The ECU 100 may conduct/control one or more portions of the method 200.

In embodiments, a system 10 and/or a method 200 may be a closed system/method. For example, the system 10 and/or the method 200 may be configured such that ambient air from an interior 94 of a facility 90 is not provided to an exterior 96 of the facility 90, and/or such that fluid from the exterior 96 of the facility 90 is not mixed to a material extent with fluid in the interior 94 of the facility 90. Such configurations may conserve water, limit contamination risks, and/or minimize power consumption.

FIG. 5 includes a table illustrating some of the comparative advantages of embodiments of the disclosed fertilizer desiccant systems 10 relative to other systems. Typically, humidity may be controlled via ventilation, where indoor humid air is ejected to the outside and replaced with fresh dry air. Such ventilation can involve significant heating and cooling to condition incoming fresh air (CPE temperature targets are commonly 16-28° C.). In very cold and hot climates, these energy loads may be even more pronounced, and lessen the effectiveness of better insulated CPE structures. Sensible heat exchangers have been proposed to reduce these heating and cooling loads, but these do not address other issues with open CPE systems, including no water vapor recovery, limited $CO_2$ enrichment, and the risk of insects, spores, and other contaminants being introduced into the plant environment. The failure of other systems to recover water vapor may be undesirable, particularly in dry climates and/or where water is not readily available.

For closed-CPEs, several alternative humidity control and water recovery systems may be considered. Conventional dew-point condensers, which are commonly used in buildings, may be applied to plant environments. However, such systems can be energy intensive, requiring significant work to cool air to its dewpoint. This inability to regulate humidity without changing temperature, means that additional energy to reheat the air is often required. In addition, condensation on the cooling coils may favor bacteria and mold growth, compromising the quality of the air that is conditioned and the water that is recovered.

Moreover, some other systems may attempt to employ toxic liquid desiccant. However, toxic liquid desiccants cannot be delivered to plants, and may require careful consideration to mitigate contamination risks and for proper disposal.

The foregoing can be in contrast with embodiments of the present disclosure, which can offer several advantages. Embodiments of a system 10 can allow for closed CPE operation, and may therefore support $CO_2$ enrichment and/or minimize introduction of insect and other contaminants to the environment. Moreover, as the disclosed systems are non-toxic, they can therefore be delivered directly to plants as nutrient solution after sufficient dilution, which can eliminate energy that is typically consumed for regeneration.

In examples, an ECU (e.g., ECU 100) may include an electronic controller and/or include an electronic processor, such as a programmable microprocessor and/or microcontroller. In embodiments, an ECU may include, for example, an application specific integrated circuit (ASIC). An ECU may include a central processing unit (CPU), a memory (e.g., a non-transitory computer-readable storage medium), and/or an input/output (I/O) interface. An ECU may be configured to perform various functions, including those described in greater detail herein, with appropriate programming instructions and/or code embodied in software, hardware, and/or other medium. In embodiments, an ECU may include a plurality of controllers. In embodiments, an ECU may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodi-ments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A fertilizer desiccant system, comprising:
   a container for holding a fertilizer-based desiccant;
   a fluid conduit including a membrane;
   a pump configured to provide said fertilizer-based desiccant to the fluid conduit;
   an air mover or humid air source to provide humid air to the fluid conduit and across the membrane to dilute the fertilizer-based desiccant with water and/or water vapor from the humid air;
   one or more plants; and
   a valve to supply diluted fertilizer-based desiccant to fertilize the one or more plants.

2. The fertilizer desiccant system of claim 1, wherein the fertilizer-based desiccant comprises a concentrated fertilizer solution.

3. The fertilizer desiccant system of claim 1, wherein a vapor pressure gradient between said fertilizer-based desiccant and said humid air drives vapor transport towards the fertilizer-based desiccant.

4. The fertilizer desiccant system of claim 1, including a heat exchanger configured to cool at least one of the fertilizer-based desiccant and said humid air.

5. The fertilizer desiccant system of claim 1, wherein said fertilizer-based desiccant includes an NPK fertilizer or blended fertilizer solution.

6. The fertilizer desiccant system of claim 5, wherein the NPK fertilizer comprises fertilizer solutes.

7. The fertilizer desiccant system of claim 1, wherein said fertilizer-based desiccant includes a single solute fertilizer.

8. The fertilizer desiccant system of claim 1, including an electronic control unit (ECU) electrically connected to at least one of the pump and the air mover.

9. The fertilizer desiccant system of claim 8, wherein the ECU is configured to control, at least in part, operation of the pump and the air mover to control a humidity level of a facility.

10. The fertilizer desiccant system of claim 8, including a heat exchanger; wherein the ECU is configured to control, at least in part, operation of the pump, the air mover, and the heat exchanger to control a humidity level of a facility.

11. The fertilizer desiccant system of claim 10, wherein an output of the heat exchanger is connected to the fluid conduit to cool said fertilizer-based desiccant provided to the fluid conduit.

12. The fertilizer desiccant system of claim 11, including a second heat exchanger; wherein an input of the second heat exchanger is connected to the fluid conduit to receive said fertilizer-based desiccant from the fluid conduit that has been diluted with moisture from said humid air.

13. The fertilizer desiccant system of claim 1, wherein the system is configured as a closed system that is not configured to mix said humid air with external fluid.

14. A method of operating the fertilizer desiccant system of claim 1, the method comprising:
providing said humid air to the fluid conduit;
providing said fertilizer-based desiccant to the fluid conduit.

15. The method of claim 14, wherein providing said humid air to the fluid conduit includes providing, via the air mover, said humid air from an interior of a facility to a first chamber of the fluid conduit.

16. The method of claim 14, including extracting moisture from the humid air and providing dried air from the fluid conduit to an interior of a facility to reduce a humidity level of the facility.

17. The method of claim 16, wherein extracting moisture from the humid air includes moisture permeating through the membrane, the membrane separating a first chamber of the fluid conduit and a second chamber of the fluid conduit.

18. The method of claim 14, wherein providing the fertilizer-based desiccant includes cooling the fertilizer-based desiccant via a heat exchanger connected to an external fluid source.

19. The method of claim 18, including increasing cooling as a concentration of the fertilizer-based desiccant decreases.

20. The method of claim 18, wherein the external fluid source includes fluid from outside of a facility.

21. The method of claim 14, wherein the valve is configured to selectively provide diluted fertilizer-based desiccant back to the container to be recirculated and/or to said one or more plants.

22. A method of operating the fertilizer desiccant system, the method comprising:
providing a fertilizer desiccant system including a container for holding a fertilizer-based desiccant; a fluid conduit including a membrane; a pump configured to provide said fertilizer-based desiccant to the fluid conduit; an air mover or humid air source to provide humid air to the fluid conduit and across the membrane to dilute the fertilizer-based desiccant with water and/or water vapor from the humid air; and a valve configured to supply diluted fertilizer-based desiccant to one or more plants;
providing said humid air to the fluid conduit;
providing said fertilizer-based desiccant to the fluid conduit; and
fertilizing the one or more plants by providing the diluted fertilizer-based desiccant to the one or more plants.

23. The method of claim 22, wherein fertilizing the one or more plants includes opening or shifting the valve.

24. The method of claim 22, including providing new fertilizer-based desiccant to the container to replace diluted fertilizer-based desiccant supplied to the one or more plants; and
extracting additional moisture from said humid air via the new fertilizer-based desiccant.

* * * * *